July 15, 1924.
E. V. GLUCK
SOAP DISPENSING
Filed June 12, 1920
1,501,657
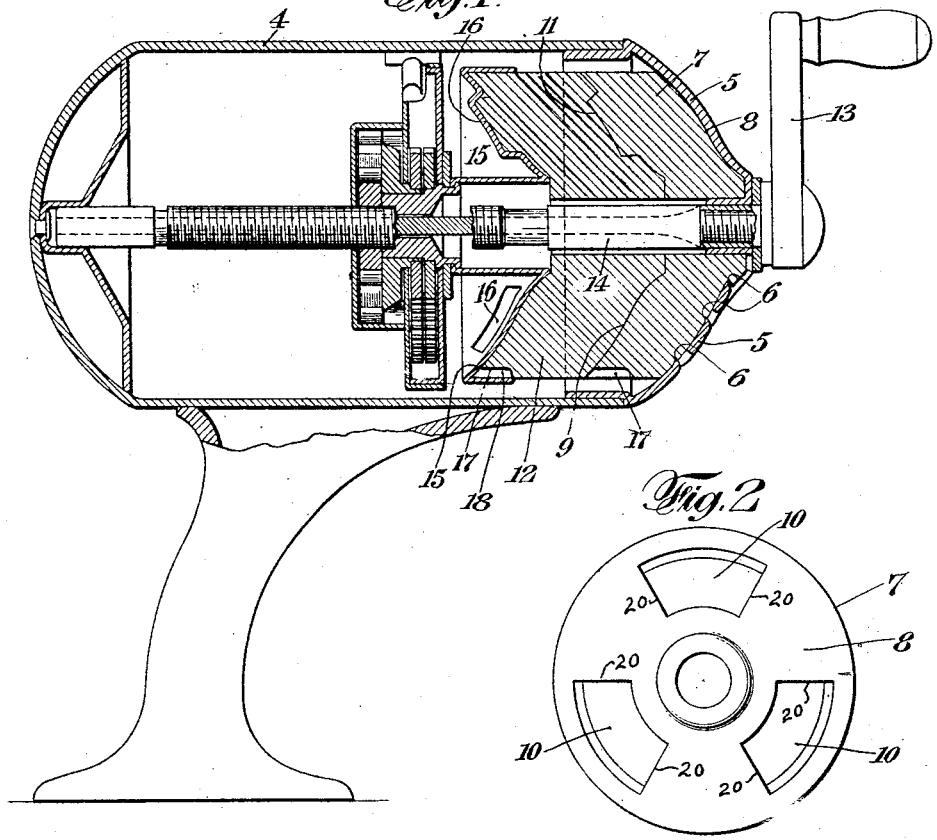
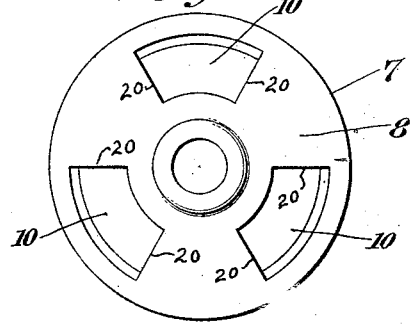
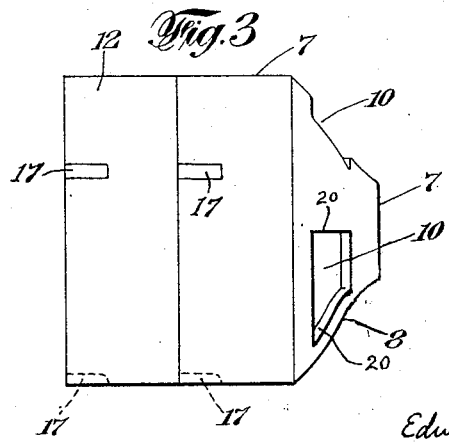
INVENTOR
Edward V. Gluck
BY
his ATTORNEY Patented July 15, 1924.

1,501,657

UNITED STATES PATENT OFFICE.

EDWARD V. GLUCK, OF RICHMOND HILL, NEW YORK, ASSIGNOR TO SOAPITOR COMPANY INCORPORATED, A CORPORATION OF NEW YORK.

SOAP DISPENSING.

Application filed June 12, 1920. Serial No. 388,403.

*To all whom it may concern:*

Be it known that I, EDWARD V. GLUCK, a citizen of the United States, and resident of Richmond Hill, county of Queens, and State of New York, have invented certain new and useful Improvements in Soap Dispensing, of which the following is a specification.

My invention relates to soap dispensing and more particularly to a cake of soap especially constructed and adapted to be dispensed by a machine for cutting off soap from one end of the cake as needed. Many forms of machines for dispensing cakes of soap have heretofore been proposed, but in prior forms many disadvantages have been found. Difficulty has been experienced in getting the cakes to fully interlock so as to be properly driven especially in the form of machines in which a relatively stationary cutter is used. Likewise difficulty has been experienced in that the edges or interlocking projections become broken off and hence cease to work. In those forms of machines employing a generally conically shaped cutter member a great deal of preliminary turning is required to get the cake shaped down to fit the knives where the maximum or desired cut may be obtained. Likewise in prior forms when one of the interlocking cakes is substantially used up and the next cake about to be cut, it is found that the remains of the first cake are apt to crumble so that the soap comes out in a very undesirable form instead of in the form of thin shavings. The main object of my invention is to overcome these disadvantages in part or in whole. A further object of the invention is to provide an arrangement by which the cakes of soap may be properly alined with the follower without difficulty. Further objects, features and advantages will more clearly appear from the detail description given below taken in connection with the accompanying sheet of drawings, which forms a part of this specification. In the drawings, Fig. 1 is a vertical section through a machine embodying my invention in a preferred form. Fig. 2 is an end view of one of the cakes of soap and Fig. 3 is a side view of two of the cakes of soap interlocked with one another.

Referring to the drawings 4 represents a soap dispensing machine of any suitable construction provided with a relatively stationary cutter member 5. The cutter member 5 is of general conical shape and provided with cutting edges 6. 7 represents one of the cakes of soap adapted to be rotated in the machine. The cake 7 is circular or cylindrical in form and provided with a substantially frustro-conical convex surface on one end at 8 adapted to fit the substantially frustro-conical concave face of the cutter member 5. The cake also has a substantially frustro-conical concave surface on the other side or end at 9. The front surface 8 is provided with irregularities in the form of depressions 10 and the other or rear end of the cake 7 is provided with corresponding irregularities in the form of projections 11, the projections 11 being adapted to fit and interlock with corresponding irregularities in the generally convex conical front surface of another cake of soap 12.

The machine 4 is provided with an operating handle 13 adapted to turn a shaft or spindle 14 which passes through central bores in the cakes of soap 7 and 12. The turning of the shaft 14 is adapted by any suitable mechanism to rotate and feed forward toward the cutter the driving member or follower 15, which follower is provided with a substantially frustro-conical convex face having irregularities at 16 adapted to receive and interlock with the projections on the concave conical end of the cake of soap 12. The arrangement shown for rotating and feeding forward the follower 15 is the same as that illustrated in Evans U. S. Patent 1,191,071 so that a further description thereof here is unnecessary. However any other suitable arrangement may be used for rotating and feeding forward the follower 15.

Each of the cakes of soap is provided with three keyways at 17 adapted to be engaged by corresponding keys or splines 18 rigid with the follower 15. The keys 18 are adapted to engage the keyways 17 in the cake of soap in advance of the engagement of the irregularities 16 on the follower with the corresponding irregularities on the cake of soap so that when the apparatus is being started up and the handle 13 is turned in order to feed the follower 15 forward to engage the rear cake of soap, the keys 18 will engage the keyways 17 and thereafter in the further forward movement of the follower 15, the depressions 16 in the follower will be accurately guided, to fit and engage the projections on the rear face of the cake of soap 12. In this way the follower is caused to become fully interlocked with the rear cake of soap 12 and the splines or keys 18 likewise help to drive the rear cake of soap 12. By providing cakes with outer convex conical surfaces to fit the cutter member 5, it does not require a lot of turning to get the cake cut down to fit the knives where the maximum and desired cut will be obtained, but the maximum and desired cut is at once obtained on the first few turns of the handle after the follower 15 has come up into full engagement with the rear cake of soap. Furthermore by providing the interlocking projections and recesses in the cakes of soap of the form shown, in which the projections and corresponding recesses in the cakes of soap and similar recesses in the follower, have each two substantially radial sides 20 lying substantially in a plane parallel with the axis of the cakes of soap as shown, and without bevelled surfaces such as are shown in U. S. Patent 824154, the cakes on being interlocked at all, become fully interlocked and the edges do not become broken off and cease to work as would often be the case with cakes having bevelled interlocking surfaces of the form shown in said U. S. Patent 824154. Likewise with this form one cake is cut down to only a shaving before it breaks and the shaving is so thin it will pass through the cutter openings without crumbling. That is, the last portion of the cake is used up and does not break up into pieces too big to pass through the cutter openings and which would slide around and break up to crumbs on the inside causing the soap to come out in the form of large crumbs hard to dissolve instead of in the form of very thin shaving.

While I have described my improvements in great detail and with respect to a preferred form thereof, I do not desire to be limited to such details and form since many changes may be made and the invention embodied in widely different forms without departing from the spirit and scope thereof in its broader aspects.

What I claim as new and desire to secure by Letters Patent is:

1. A cake of soap adapted for use in a dispensing machine and having a substantially frustro-conical convex face on one end and a substantially frustro-conical concave face on the other end, said faces being provided with irregularities adapted to fit and interlock with a similar cake of soap.

2. A unitary cake of soap adapted for use in a dispensing machine and having a central bore for the operating spindle of the machine and a substantially frustro-conical convex face on one end and a substantially frustro-convex concave face on the other end, said faces being provided with irregularities adapted to fit and interlock with a similar cake of soap and the irregularities on one end being adapted to fit and interlock with a driving member or follower of the dispensing machine.

3. A unitary cylindrical cake of soap adapted for use in a dispensing machine and having a substantially frustro-conical convex face on one end and a substantially frustro-conical concave face on the other end, said faces being provided with irregularities adapted to fit and interlock with a similar cake of soap, the irregularities on one end being adapted to fit and interlock with a driving member or follower of the dispensing machine and the outer cylindrical face of the cake being provided with a keyway for engagement with an alignment key on the driving member or follower.

4. A unitary cake of soap adapted for use in a dispensing machine and having a substantially frustro-conical convex face on one end and a substantially frustro-conical concave face on the other end, said faces being provided with irregularities adapted to fit and interlock with a similar cake of soap, and the irregularities on the concave end being adapted to fit and interlock with a driving member or follower of the dispensing machine.

5. A cake of soap adapted for use in a dispensing machine and having a substantially frustro-conical convex face on one end and a substantially frustro-conical concave face on the other end, said faces being provided with irregularities adapted to fit and interlock with a similar cake of soap, said irregularities consisting of projections and corresponding recesses each having two substantially radial sides lying substantially in a plane parallel with the axis of the cake of soap.

6. An arrangement of the class described comprising a cake of soap having a generally convex conical face on one end adapted to fit a substantially frustro-conical concave face of a cutter member of a dispensing machine, and the cake having a substantially frustro-conical concave face on its opposite end, the said faces of said cake being provided with irregularities adapted to fit and interlock with a similar cake of soap.

7. An arrangement of the class described comprising a unitary cake of soap having a substantially frustro-conical convex face on one end and a substantially frustro-conical concave face on the opposite end, the latter face being adapted to fit a substantially frustro-conical convex face of a follower of a dispensing machine, the said faces of said cake being provided with irregularities adapted to fit and interlock with a similar cake of soap.

8. An arrangement of the class described comprising a cake of soap having a substantially frustro-conical convex face on one end and a substantially frustro-conical concave face on the opposite end, the latter face being adapted to fit a substantially frustro-conical convex face of a follower of a dispensing machine, the said faces of said cake being provided with irregularities adapted to fit and interlock with a similar cake of soap, and the said follower being provided with corresponding irregularities to rotate and feed the cake.

9. An arrangement of the class described comprising a unitary cake of soap having a substantially frustro-conical convex face on one end and a substantially frustro-conical concave face on the opposite end, the latter face being adapted to fit a substantially frustro-conical convex face of a follower of a dispensing machine, and the cake being provided with a keyway engaged by a spline or key on the follower to aid in properly alining the cake of soap with the follower.

In testimony whereof, I have signed my name to this specification.

EDWARD V. GLUCK.

Certificate of Correction.

It is hereby certified that in Letters Patent No. 1,501,657, granted July 15, 1924, upon the application of Edward V. Gluck, of Richmond Hill, New York, for an improvement in "Soap Dispensing," an error appears in the printed specification requiring correction as follows: Page 2, lines 113 and 114, claim 6, strike out the words "generally convex conical" and insert instead *substantially frustro-conical concave;* and that the said Letters Patent should be read with this correction therein that the same may conform to the record of the case in the Patent Office.

Signed and sealed this 19th day of August, A. D. 1924.

[SEAL.]
KARL FENNING,
*Acting Commissioner of Patents.*